(12) United States Patent
Weise

(10) Patent No.: US 7,506,444 B2
(45) Date of Patent: Mar. 24, 2009

(54) VEHICLE SUSPENSION CONTROL ARM AND METHOD

(75) Inventor: Kenneth A. Weise, Lake Orion, MI (US)

(73) Assignee: Benteler Automotive Corporation, Auburn Hills, MI (US)

( * ) Notice: Subject to any disclaimer, the term of this patent is extended or adjusted under 35 U.S.C. 154(b) by 283 days.

(21) Appl. No.: 11/107,938

(22) Filed: Apr. 14, 2005

(65) Prior Publication Data

US 2006/0232038 A1  Oct. 19, 2006

(51) Int. Cl.
  B21D 53/88  (2006.01)
(52) U.S. Cl. .................. 29/897.2; 29/557; 74/588; 72/338
(58) Field of Classification Search ............ 29/897, 29/897.2, DIG. 37, 557; 74/588, 593; 83/55, 83/518, 681, 684; 72/333, 338, 339
See application file for complete search history.

(56) References Cited

U.S. PATENT DOCUMENTS

| | | | |
|---|---|---|---|
| 1,885,976 A | | 11/1932 | Yandell |
| 1,913,513 A | | 6/1933 | Rossman et al. |
| 2,860,527 A | | 11/1958 | Fritz |
| 3,022,847 A | * | 2/1962 | Hansen et al. ............ 180/295 |
| 3,037,271 A | * | 6/1962 | Schilberg .................. 29/415 |
| 3,121,348 A | | 2/1964 | Reed |
| 3,972,744 A | * | 8/1976 | Cantrell ................... 148/572 |
| 4,343,661 A | * | 8/1982 | Rice ....................... 148/586 |
| 4,369,742 A | * | 1/1983 | Everts ..................... 123/193.6 |
| 4,480,498 A | * | 11/1984 | Konig ...................... 74/579 R |
| 5,669,992 A | * | 9/1997 | Bronsema et al. .......... 148/602 |
| 5,672,216 A | * | 9/1997 | Robic ....................... 148/527 |
| 6,241,267 B1 | * | 6/2001 | Dziadosz et al. .......... 280/124.134 |
| 6,348,112 B1 | * | 2/2002 | Hildreth et al. ............ 148/658 |
| 6,557,318 B2 | | 5/2003 | Graber |
| 2002/0005621 A1 | * | 1/2002 | Christophliemke et al. ............... 280/124.134 |
| 2003/0025341 A1 | * | 2/2003 | Kollaritsch et al. ......... 293/102 |
| 2003/0034625 A1 | * | 2/2003 | Runte et al. ............. 280/124.134 |
| 2003/0101847 A1 | * | 6/2003 | Harimoto et al. .......... 74/579 R |
| 2004/0070129 A1 | | 4/2004 | Budde et al. |
| 2004/0075234 A1 | | 4/2004 | Seksaria et al. |
| 2004/0123462 A1 | * | 7/2004 | Preijert et al. .............. 29/897.2 |

(Continued)

FOREIGN PATENT DOCUMENTS

DE  3921468 C1  5/1990

(Continued)

*Primary Examiner*—David P Bryant
*Assistant Examiner*—Christopher M Koehler
(74) *Attorney, Agent, or Firm*—Price, Heneveld, Cooper, Dewitt & Litton, LLP

(57) ABSTRACT

A control arm for vehicle suspension systems has first and second rigid arm plates having first and second apertures extend laterally through opposing faces of the body adjacent opposite ends thereof. The arm plates are disposed in a mutually parallel, laterally spaced apart and aligned relationship. The first apertures are generally concentric and the second apertures are generally concentric. First and second spacers each have a rigid body with opposite ends and a central bushing aperture extending therebetween. The spacers are disposed between the arm plates adjacent opposite ends thereof. The central bushing aperture of the spacers is positioned generally concentrically with the apertures. Also included is a related method for making vehicle suspension links from ultra high strength steel.

18 Claims, 3 Drawing Sheets

U.S. PATENT DOCUMENTS

| | | |
|---|---|---|
| 2004/0131418 A1 | 7/2004 | Budde et al. |
| 2005/0082346 A1* | 4/2005 | McNulty et al. ......... 228/173.4 |
| 2005/0104315 A1* | 5/2005 | Howell et al. ......... 280/124.134 |
| 2006/0060268 A1* | 3/2006 | Machrowicz et al. ....... 148/575 |

FOREIGN PATENT DOCUMENTS

| | | |
|---|---|---|
| DE | 20317345 U1 | 2/2004 |
| EP | 1125774 A2 | 8/2001 |
| EP | 1423547 B1 | 6/2004 |
| JP | 08233009 | 9/1996 |
| JP | 11115429 | 4/1999 |
| JP | 2004359137 A | 12/2004 |
| WO | WO 01/38113 A1 | 5/2001 |

* cited by examiner

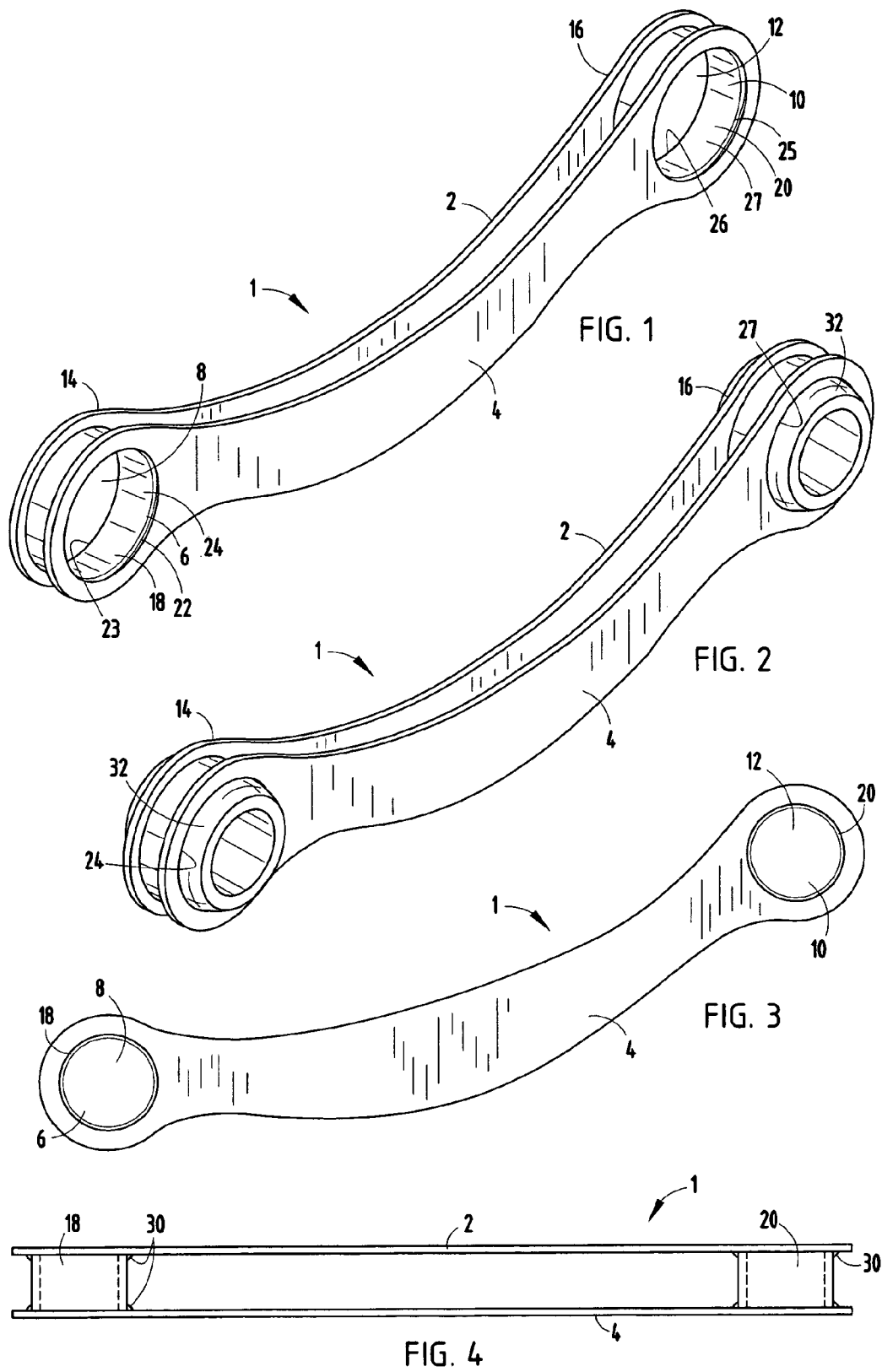

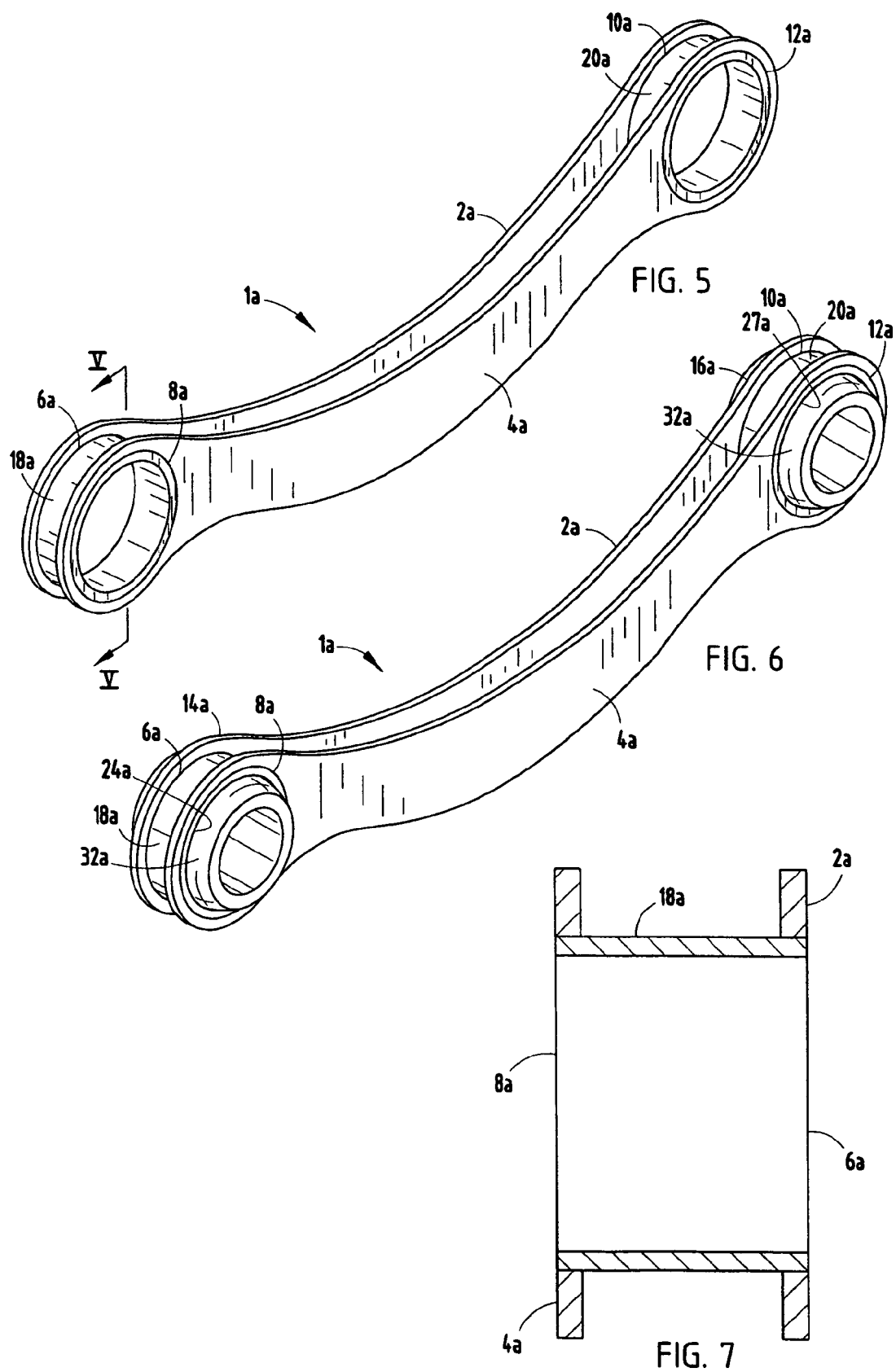

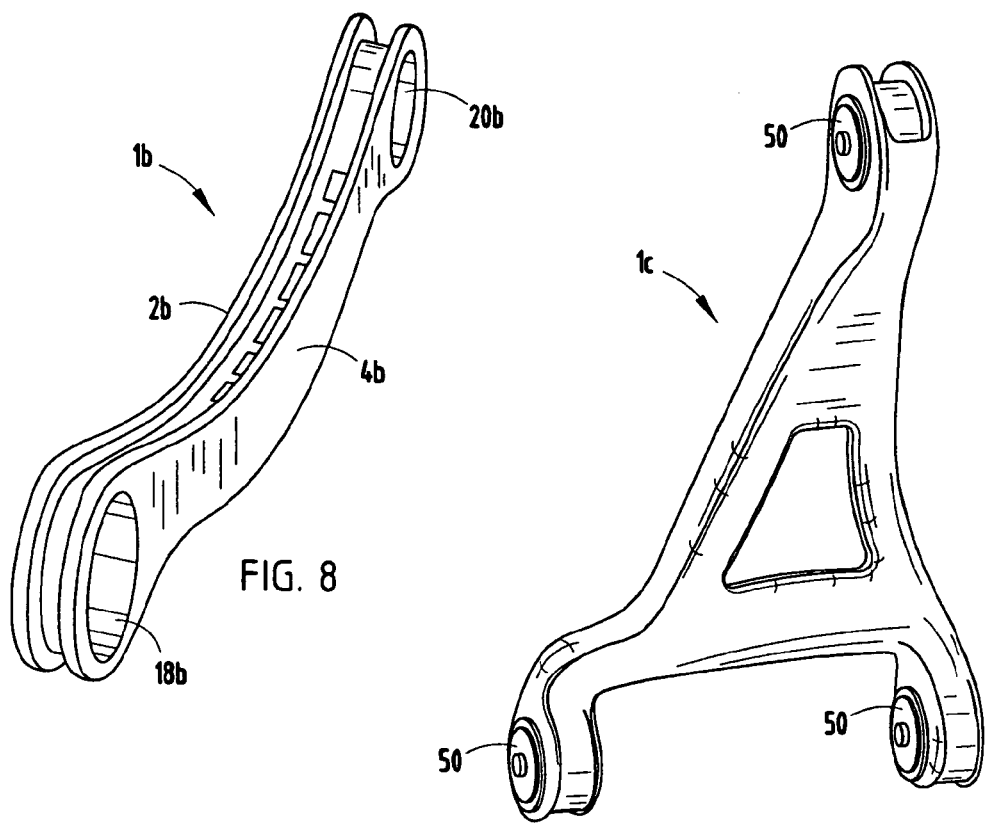
FIG. 8
FIG. 9
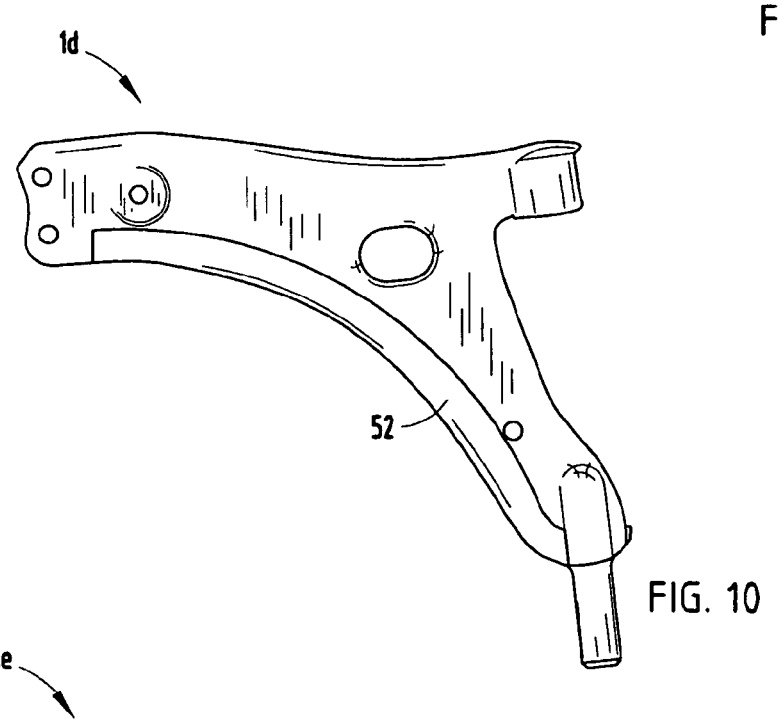
FIG. 10
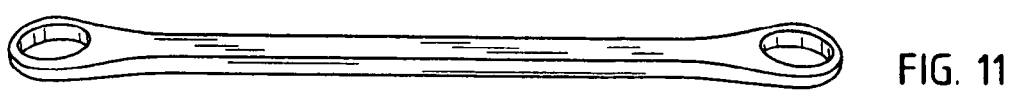
FIG. 11

VEHICLE SUSPENSION CONTROL ARM AND METHOD

BACKGROUND OF THE INVENTION

The present invention relates to motor vehicles and the like and in particular to a high strength vehicle suspension link or control arm and related method.

During movement or operation, a variety of forces act upon the wheels of a motor vehicle. These forces are transferred from the wheels to the vehicle frame and all of its related components, and are typically referenced with respect to a vehicle in its standard horizontal position where all four wheels are in contact with the ground. Vertical loads act downwardly on the vehicle and are frequently encountered when the vehicle travels, particularly over bumps or holes in the road, inclines, etc. In addition, longitudinal forces act upon the wheels against the direction of travel while the vehicle is moving. Further, transverse forces push and pull the wheels laterally towards and away from the frame structure when the vehicle turns. A vehicle suspension system must be able to withstand the various forces acting on the vehicle, whether vertical, longitudinal or transverse, singly or in combination.

In many vehicle suspension systems, at least one link or control arm is used to couple the wheels to the frame of the vehicle. Such suspension components must be sufficiently rigid or stiff to accommodate all of the above-noted forces without cracking or fracturing. Yet, such suspension components are preferably light weight to improve vehicle efficiency and performance. While such suspension components may be made from aluminum, the same are relatively expensive to manufacture, particularly for applications requiring high structural strength and reliability.

Accordingly, a light weight suspension link or control arm having high strength to withstand a variety of forces, yet being economical to manufacture, is desired.

SUMMARY OF THE INVENTION

One aspect of the present invention is a control arm for vehicle suspension systems having first and second arm plates, each having a rigid, generally planar body constructed from ultra high strength steel. First and second apertures extend laterally through opposing faces of the body adjacent opposite ends thereof. The first and second arm plates are disposed in a mutually parallel, laterally spaced apart and aligned relationship, such that the first apertures are generally concentric, and the second apertures are generally concentric. First and second spacers each have a rigid body with opposite ends and a central bushing aperture extending therebetween. The first and second spacers are disposed between the first and second arm plates adjacent the opposite ends thereof. The central bushing aperture of the first spacer is positioned generally concentrically with the first apertures, and the central bushing aperture of the second spacer is positioned generally concentrically with the second apertures. Means are provided for rigidly attaching the ends of the first and second spacers to the first and second arm plates to fixedly retain the first and second arm plates in the mutually parallel, laterally spaced apart and aligned relationship without intermediate support between the first and second spacers.

Another aspect of the present invention is a control arm for vehicle suspension systems including first and second arm plates each having a rigid, generally planar body constructed from high strength steel, and first and second apertures extending laterally through opposing faces of the body adjacent opposite ends thereof. The first and second arm plates are disposed in a mutually parallel, laterally spaced apart and aligned relationship, such that the first apertures are generally concentric, and the second apertures are generally concentric. First and second spacers each have a rigid body with opposite ends and a central bushing aperture extending therebetween. The first and second spacers are disposed between the first and second arm plates adjacent the opposite ends thereof. The central bushing aperture of the first spacer is positioned generally concentrically with the first apertures, and the central bushing aperture of the second spacer is positioned generally concentrically with the second apertures. The ends of the first and second spacers are rigidly attached to the first and second arm plates to fixedly retain the first and second arm plates in the mutually parallel, laterally spaced apart and aligned relationship without intermediate support between the first and second spacers.

Yet another aspect of the present invention is a control arm for vehicle suspension systems including first and second rigid arm plates having first and second apertures adjacent opposite ends thereof disposed in a laterally spaced apart and aligned relationship, such that the first apertures are generally concentric and the second apertures are generally concentric. First and second spacers each have a rigid body with opposite ends and a central bushing aperture extending therebetween. The central bushing aperture of the first spacer is disposed generally concentrically with the first apertures, and the central bushing aperture of the second spacer is disposed generally concentrically with the second apertures. The ends of the first and second spacers are operably connected with the first and second arm plates to retain the first and second arm plates in a laterally spaced apart and aligned relationship.

Yet another aspect of the present invention is a method for making a control arm for vehicle suspension systems including forming from ultra high strength steel first and second arm plates each having a rigid, generally planar body. First and second apertures are formed laterally through opposing faces of the body adjacent opposite ends thereof. The first and second arm plates are positioned in a mutually parallel, laterally spaced apart and aligned relationship, such that the first apertures are generally concentric, and the second apertures are generally concentric. First and second spacers are formed, each having a rigid body with opposite ends, and a central bushing aperture extending therebetween. The first and second spacers are positioned between the first and second arm plates adjacent the opposite ends thereof, with the central bushing aperture of the first spacer positioned generally concentric with the first apertures, and the central bushing aperture of the second spacer positioned generally concentric with the second apertures. The ends of the first and second spacers are rigidly attached to the first and second arm plates to fixedly retain the first and second arm plates in the mutually parallel, laterally spaced apart and aligned relationship.

Yet another aspect of the present invention is a method for making a vehicle suspension link, comprising providing a sheet of ultra high strength steel alloy, and stamping a vehicle suspension link from the same. The method further includes heating and quenching the stamped vehicle suspension link to harden the ultra high strength steel in the vehicle suspension link.

The present invention provides a light weight solution in the form of ultra high strength suspension links or control arms. The control arms may be made by using two side-by-side arm plates stamped from high strength steel. Significant costs savings during production of the control arms can be realized compared to production of aluminum and other light weight material control arms. Additionally, the materials and processes used to make the control arm provide ultra high strength without brittleness.

These and other features, advantages and objects of the present invention will be further understood and appreciated by those skilled in the art by reference to the following written specification, claims and appended drawings.

BRIEF DESCRIPTION OF THE DRAWINGS

FIG. 1 is a perspective view of a vehicle control arm embodying the present invention;

FIG. 2 is a perspective view of the control arm of FIG. 1 with bushings installed therein;

FIG. 3 is a side elevational view of the control arm of FIG. 1;

FIG. 4 is a top plan view of the control arm of FIG. 1;

FIG. 5 is a perspective view of a second embodiment of a control arm embodying the present invention;

FIG. 6 is a perspective view of the control arm of FIG. 5 with bushings installed therein;

FIG. 7 is an enlarged cross-sectional view of the control arm of FIGS. 5 and 6 taken along the line V-V, FIG. 5;

FIG. 8 is a perspective view of a third embodiment of a vehicle control arm embodying the present invention;

FIG. 9 is a perspective view of a fourth embodiment of a vehicle control arm embodying the present invention;

FIG. 10 is a perspective view of a fifth embodiment of a vehicle control arm embodying the present invention; and FIG. 11 is a perspective view of a sixth embodiment of a vehicle control arm embodying the present invention.

DETAILED DESCRIPTION OF THE PREFERRED EMBODIMENTS

For purposes of description herein the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIG. 1, the reference numeral 1 generally designates a suspension link or control arm embodying the present invention, which is designed for use in a vehicle suspension system (not shown). The term "control arm", as used herein, refers to a suspension link or guide control rod for vehicle suspension systems, and is intended to incorporate all such, and similar components. Control arm 1 has first and second rigid arm plates 2, 4, each having first apertures 6, 8 and second apertures 10, 12 extend laterally through opposing faces thereof adjacent opposite ends 14, 16 of arm plates 2, 4. First and second arm plates 2, 4 are disposed in a mutually parallel, laterally spaced apart and aligned relationship, such that the first apertures 6, 8 are generally concentric, and the second apertures 10, 12 are also generally concentric. First and second spacers 18, 20 are disposed between the first and second arm plates 2, 4 adjacent opposite ends 14, 16 thereof. The first spacer 18 has a rigid body with opposite ends 22, 23 and a central bushing aperture 24 extending therebetween. Similarly, the second spacer 20 has a rigid body with opposite ends 25, 26 and a central bushing aperture 27 extending therebetween. The central bushing aperture 24 of the first spacer 18 is positioned generally concentric with the first apertures 6, 8, and the central bushing aperture 27 of the second spacer 20 is positioned generally concentric with the second apertures 10, 12. The ends of the first and second spacers 18, 20 are rigidly attached to the first and second arm plates 2, 4 to fixedly retain the first and second arm plates 2, 4 in the mutually parallel, laterally spaced apart and aligned relationship.

The first and second arm plates 2, 4 of FIGS. 1-4 have a generally uniform thickness in the range of 1 to 5 millimeters and more preferably 2 to 2.5 millimeters. The first and second arm plates 2, 4 are preferably stamped from a sheet of ultra high strength steel. The arm plates 2, 4 are then connected to the first and second spacers 18, 20 in the fashion described herein. After assembly is complete, the first and second arm plates 2, 4 and the first and second spacers 18, 20 can be heat treated to further strengthen the control arm 1.

In the example illustrated in FIGS. 1, 3 and 4, the first and second spacers 18, 20 each have a generally cylindrical or annular shape with a predetermined outside diameter. The spacers 18, 20 may be constructed of predetermined lengths of high strength steel tubing. The outside diameter of the first spacer 18 is greater than that diameter of the first apertures 6, 8 in the first and second arm plates 2, 4. Consequently, the opposite ends of the first spacer abut adjacent ones of the faces of the first and second arm plates 2, 4. Similarly, the outside diameter of the second spacer 20 is greater than the diameter of the second apertures 10, 12 in the first and second arm plates 2, 4 such that the opposite ends of the second spacer 20 abut adjacent ones of the faces of the first and second arm plates 2, 4.

The control arm 1 shown in FIGS. 1-4 includes welds 30 (FIG. 4) between opposite ends of the first spacer 18 and adjacent faces of the first and second arm plates 2, 4. Welds 30 are also used between the opposite ends of the second spacer 20 in the adjacent faces of the first and second arm plates 2, 4. The spacers 18, 20 and first and second arm plates 2, 4 can be spot-welded at predetermined points around the circumference of the spacers 18, 20 adjacent faces of the first and second arm plates 2, 4. Alternatively, the spacers 18, 20 can be seam-welded continuously around the circumference of the spacers 18, 20 adjacent faces of the first and second arm plates 2, 4. Spacers 18, 20 can also be projection welded and friction welded.

In the example shown in FIG. 2, a fixed or removable cylindrical metal lining, such as a bushing 32, is mounted in the central bushing aperture 24 of spacer 18, and the central bushing aperture 27 of spacer 20 to constrain, guide, or reduce friction. Bushing 32 may be mounted in both central apertures 24, 27, or just one. The bushings 32 include structures such as bearing receptors, ball joints, bolt receptors, etc.

The reference numeral 1a (FIGS. 5-7) generally designates another embodiment of the control arm of the present invention. Since control arm 1a is similar to the previously described control arm 1 of FIGS. 1-4, similar parts appearing in FIGS. 5-7 are represented by the same, corresponding reference numeral, except for the suffix "a" in the numerals of the latter.

In the embodiment shown in FIGS. 5-7, the outside diameter of first spacer 18a is substantially equal to the diameter of first apertures 6a, 8a in first and second arm plates 2a, 4a. In this instance, the opposite ends of the first spacer 18a are press fit into the first apertures 6a, 8a of the first and second arm plates 2a, 4a. The ends of the first spacer 18a may protrude somewhat beyond the planar extent of the first and second arm plates 2a, 4a, or the ends may be flush with or insert from the planar extent of the first and second arm plates 2a, 4a. This press fit construction defines at least a portion of the attachment between arm plates 2a, 4a and spacer 18a. In addition, the same press fit construction may exist with respect to the second spacer 20a and its relationship with second apertures 10a, 12a of the first and second arm plates 2a, 4a. The spacers 18a, 20a are attached to the first and second arm plates 2a, 4a by being pressed into an interference fit with one another. However, the same means of attaching the spacers 18a, 20a as described in the first embodiment (FIGS. 1-4), such as welding, etc., may also be employed for additional rigidity.

FIG. 6 illustrates a fixed or removable cylindrical metal lining, such as a bushing 32a, which is mounted in the central bushing aperture 24a of the first spacer 18a and the central bushing aperture 27a of the second spacer 20a to constrain, guide, or reduce friction. The bushing 32a may be mounted in both central bushing apertures 24a, 27a, or just one. The bushings 32a include structures such as bearing receptors, ball joints, bolt receptors, etc.

The control arm 1a of FIGS. 5-7 may be constructed of the same steel alloy having the same percent by weight of its elemental components as control arm 1 of FIGS. 1-4. The first and second arm plates 2a, 4a have a uniform thickness in the range of 1 to 5 millimeters and more preferably 2 to 2.5 millimeters. Further, the first and second arm plates 2a, 4a are stamped from a sheet of ultra high strength steel and connected to the first and second spacers 18a, 20a. After assembly is complete, the first and second arm plates 2a, 4a and the first and second spacers 18a, 20a are heat treated to further strengthen the control arm 1a.

In a multi-piece control arm arrangement 1b shown in FIG. 8, first and second arm plates 2b, 4b of the control arm 1b are constructed from a Boron-Manganese or a Chrome-Molybdenum-Vanadium steel alloy. The multi-piece arrangement of control arm 1b permits hardening before or after welding the first and second arm plates 2b, 4b to the spacers 18b, 20b. For fully heating the steel, a salt bath is preferred for control arm 1b because it minimizes distortion in long thin components (such as arm plates 2b, 4b). In addition, the first and second arm plates 2b, 4b are hot stamped to increase hardness of the control arm 1b.

Alternatively, to fully heat treat the steel, resistive heat, inductive heat or oven heat may be applied to the steel. After applying the heat source, the steel is quenched by either water, salt or oil.

For single piece stampings, such as the embodiment shown in FIG. 9, the control arm 1c is subjected to a heated salt bath and quenched by a secondary salt bath or possibly quenched by water or oil. After the part has hardened, bushings 50 are pressed into the control arm 1c, and the control arm 1c is painted. Alternatively, as in the multi-piece arrangement described above for control arm 1, 1a, resistive heat, inductive heat or oven heat is applied to the steel of the control arm 1c before quenching the steel with water, salt or oil.

The example illustrated in FIG. 10 is a multi-piece control arm 1d with a specified heat treatment area 52 and therefore local hardening is required. After welding the various components together, the area 52 is heated via an inductive coil or via electrical resistance.

Once properly heated by the reductive heat from an inductive coil or resistive heat from electrical resistance, the control arm 1d is then quenched with water, salt or oil. Localized hardening is also used in heat treating specific areas of a single piece, non-welded control arm 1e such as that shown in FIG. 11.

In operation, the control arm 1 shown in FIGS. 1-4 may be manufactured in the following manner. A pair of substantially identically shaped arm plates 2, 4 are stamped from a sheet of high strength steel, such as that noted above, having a thickness in the range of 1 to 5 millimeters, a preferably 2 to 2.5 millimeters. One example of a suitable steel is disclosed in the Benteler A G U.S. Pat. No. 5,972,134, which is hereby incorporated herein by reference. In one working example of the present invention, steel strip 30 is hot rolled, and selected from a steel alloy comprising, in percent by weight, the following:
carbon (C) 0.20% to 0.27%,
silicon (Si) 0.15% to 0.50%,
manganese (Mn) 1.0% to 1.40%,
phosphorus (P) 0.0% to 0.03%,
chromium (Cr) 0.0% to 0.35%,
molybdenum (Mo) 0.0% to 0.35%,
sulfur (S) at most 0.0% to 0.01%,
titanium (Ti) 0.0% to 0.05%,
boron (B) 0.0005% to 0.0040%,
aluminum (Al) 0.0% to 0.06%, and
copper (Cu) 0.0% to 0.10%, where the remainder is iron, including impurities brought about as a result of smelting.

In another working example of the present invention, steel strip 30 is hot rolled, and selected from a steel alloy comprising, in percent by weight, the following:
carbon (C) 0.18% to 0.3%,
silicon (Si) 0.1% to 0.7%,
manganese (Mn) 1.0% to 2.50%,
phosphorus (P) at most 0.025%,
chromium (Cr) 0.1% to 0.8%,
molybdenum (Mo) 0.1% to 0.5%,
sulfur (S) at most 0.01%,
titanium (Ti) 0.02% to 0.05%,
boron (B) 0.002% to 0.005%, and
aluminum (Al) 0.01% to 0.06%, where the remainder is iron, including impurities brought about as a result of smelting.

In yet another working example of the present invention, steel strip 30 is hot rolled, and selected from a steel alloy comprising, in percent by weight, the following:
carbon (C) 0.23% to 0.27%,
silicon (Si) 0.15% to 0.50%,
manganese (Mn) 1.10% to 1.400%,
phosphorus (P) at most 0.025%,
chromium (Cr) 0.15% to 0.35%,
molybdenum (Mo) 0.10% to 0.35%,
sulfur (S) at most 0.01%,
titanium (Ti) 0.03% to 0.05%,
boron (B) 0.002% to 0.004%,
aluminum (Al) 0.02% to 0.06%, and
cooper (Cu) at most 0.10%, where the remainder is iron, including impurities brought about as a result of smelting.

In another working example of the present invention, steel strip 30 is hot rolled, and selected from a steel alloy comprising, in percent by weight, the following:
carbon (C) 0.20% to 0.26%,
silicon (Si) 0.15% to 0.3%,
manganese (Mn) 1.0% to 1.40%,
phosphorus (P) at most 0.03% maximum,
chromium (Cr) not applicable,
molybdenum (Mo) not applicable,
sulfur (S) at most 0.01%, titanium (Ti) not applicable,
boron (B) 0.0005% to 0.0030%, and
aluminum (Al) 0.06% maximum, where the remainder is iron, including impurities brought about as a result of smelting.

Arm plates 2, 4 can be either cold stamped or hot stamped, depending upon the characteristics desired for control arm 1. Bushing apertures 6, 8 and 10, 12 are preferably formed adjacent the opposite ends of arm plates 2, 4 during the stamping operation, but could be formed in a separate operation. A pair of substantially identical spacers 18, 20 are formed by cutting or severing the same from an elongate length of high strength steel tubing. The arm plates 2, 4 are arranged in a substantially parallel spaced apart fashion with spacers 18, 20 arranged at opposite ends thereof. Arm plates 2, 4 and spacers 18, 20 may be retained in their predetermined aligned relationship by an assembly jig or the like (not shown). The ends of spacers 18, 20 are then welded or otherwise affixed to the abutting faces of arm plates 2, 4 to define a rigid assembly, without intermediate support between arm plates 2, 4. The assembled suspension link 1 is then heated by means such as inductive heat, resistive heat, oven heat or the like, and then quenched with water, oil, salt or other similar products to harden the selected steel alloy. Bushings 32 are then inserted into the interior of spacers 18, 20 to complete the assembly for installation in an associated vehicle.

The control arm 1a illustrated in FIGS. 5-7 is preferably manufactured in a similar manner, except that spacers 18a and 20a are press fit into the associated apertures 6a, 8a and 10a, 12a in arm plates 2a, 4a.

In the foregoing description, it will be readily appreciated by those skilled in the art that modifications may be made to the invention without departing from the concepts disclosed herein. Such modifications are to be considered as included in the following claims, unless these claims, by their language, expressly state otherwise.

The invention claimed is:

1. A method for making a vehicle suspension link, comprising:
   providing a sheet of ultra high strength steel;
   stamping from the sheet of ultra high strength steel first and second link plates, each with a similarly shaped, rigid, generally planar body and first and second laterally extending bushing apertures disposed adjacent opposite ends thereof;
   forming first and second spacers each having a rigid body with a central bushing aperture;
   rigidly attaching opposite ends of the first and second spacers with the first and second link plates with the central bushing apertures arranged concentric with the first and second apertures in the first and second link plates to fixedly retain the first and second link plates in a mutually parallel, laterally spaced apart and aligned relationship to define the vehicle suspension link;
   heating the vehicle suspension link to a predetermined temperature sufficient for heat treating the ultra high strength steel;
   quenching the vehicle suspension link to harden the ultra high strength steel; and
   mounting bushings in the first and second bushing apertures in the vehicle suspension link.

2. A method as set forth in claim 1, wherein:
   said heating and quenching steps are performed after said attaching step.

3. A method as set forth in claim 2, wherein:
   said first and second spacers forming step includes cutting the first and second spacers from a length of tubing, such that the same have a generally annular shape with a predetermined outside diameter.

4. A method as set forth in claim 3, wherein:
   said first and second spacers forming step includes selecting the outside diameter of the first spacer greater than the diameter of the first apertures in the first and second link plates, and abutting the opposite ends of the first spacer with adjacent ones of the faces of the first and second link plates.

5. A method as set forth in claim 4, wherein:
   said attaching step includes welding the opposite ends of the first spacer to the adjacent ones of the faces of the first and second link plates.

6. A method as set forth in claim 5, wherein:
   said first and second spacers forming step includes selecting the outside diameter of the second spacer greater than the diameter of the second apertures in the first and second link plates, and abutting the opposite ends of the second spacer with adjacent ones of the faces of the first and second link plates.

7. A method as set forth in claim 6, wherein:
   said attaching step includes welding the opposite ends of the second spacer to the adjacent ones of the faces of the first and second link plates.

8. A method as set forth in claim 7, wherein:
   said heat treating step uses a salt bath.

9. A method as set forth in claim 8, wherein:
   said heat treating step comprises inductive heating.

10. A method as set forth in claim 9, wherein:
    said sheet selecting step includes selecting a blank from a steel alloy comprising, in percent by weight,
    carbon (C) 0.20% to 0.27%,
    silicon (Si) 0.15% to 0.50%,
    manganese (Mn) 1.0% to 1.40%,
    phosphorus (P) 0.0% to 0.03%,
    chromium (Cr) 0.0% to 0.35%,
    molybdenum (Mo) 0.0% to 0.35%,
    sulfur (S) at most 0.0% to 0.01%,
    titanium (Ti) 0.0% to 0.05%,
    boron (B) 0.0005% to 0.0040%,
    aluminum (Al) 0.0% to 0.06%, and
    copper (Cu) 0.0% to 0.10%, where the remainder is iron, including impurities brought about as a result of smelting.

11. A method as set forth in claim 1, wherein:
    said first and second spacers forming step includes cutting the first and second spacers from a length of tubing, such that the same have a generally annular shape with a predetermined outside diameter.

12. A method as set forth in claim 1, wherein:
    said first and second spacers forming step includes selecting the outside diameter of the first spacer greater than the diameter of the first apertures in the first and second link plates, and abutting the opposite ends of the first spacer with adjacent ones of the faces of the first and second link plates.

13. A method as set forth in claim 12, wherein:
    said attaching step includes welding the opposite ends of the first spacer to the adjacent ones of the faces of the first and second link plates.

14. A method as set forth in claim 1, wherein:
    said first and second spacers forming step includes selecting the outside diameter of the second spacer greater than the diameter of the second apertures in the first and second link plates, and abutting the opposite ends of the second spacer with adjacent ones of the faces of the first and second link plates.

15. A method as set forth in claim 14, wherein:

said attaching step includes welding the opposite ends of the second spacer to the adjacent ones of the faces of the first and second link plates.

16. A method as set forth in claim 1, wherein:

said heat treating step uses a salt bath.

17. A method as set forth in claim 1, wherein:

said heat treating step comprises inductive heating.

18. A method as set forth in claim 1, wherein:

said sheet selecting step includes selecting a blank from a steel alloy comprising, in percent by weight, carbon (C) 0.20% to 0.27%,
silicon (Si) 0.15% to 0.50%,
manganese (Mn) 1.0% to 1.40%,
phosphorus (P) 0.0% to 0.03%,
chromium (Cr) 0.0% to 0.35%,
molybdenum (Mo) 0.0% to 0.35%,
sulfur (5) at most 0.0% to 0.01%,
titanium (Ti) 0.0% to 0.05%,
boron (B) 0.0005% to 0.0040%,
aluminum (Al) 0.0% to 0.06%, and
copper (Cu) 0.0% to 0.10%, where the remainder is iron, including impurities brought about as a result of smelting.

* * * * *